Figures 1, 2:
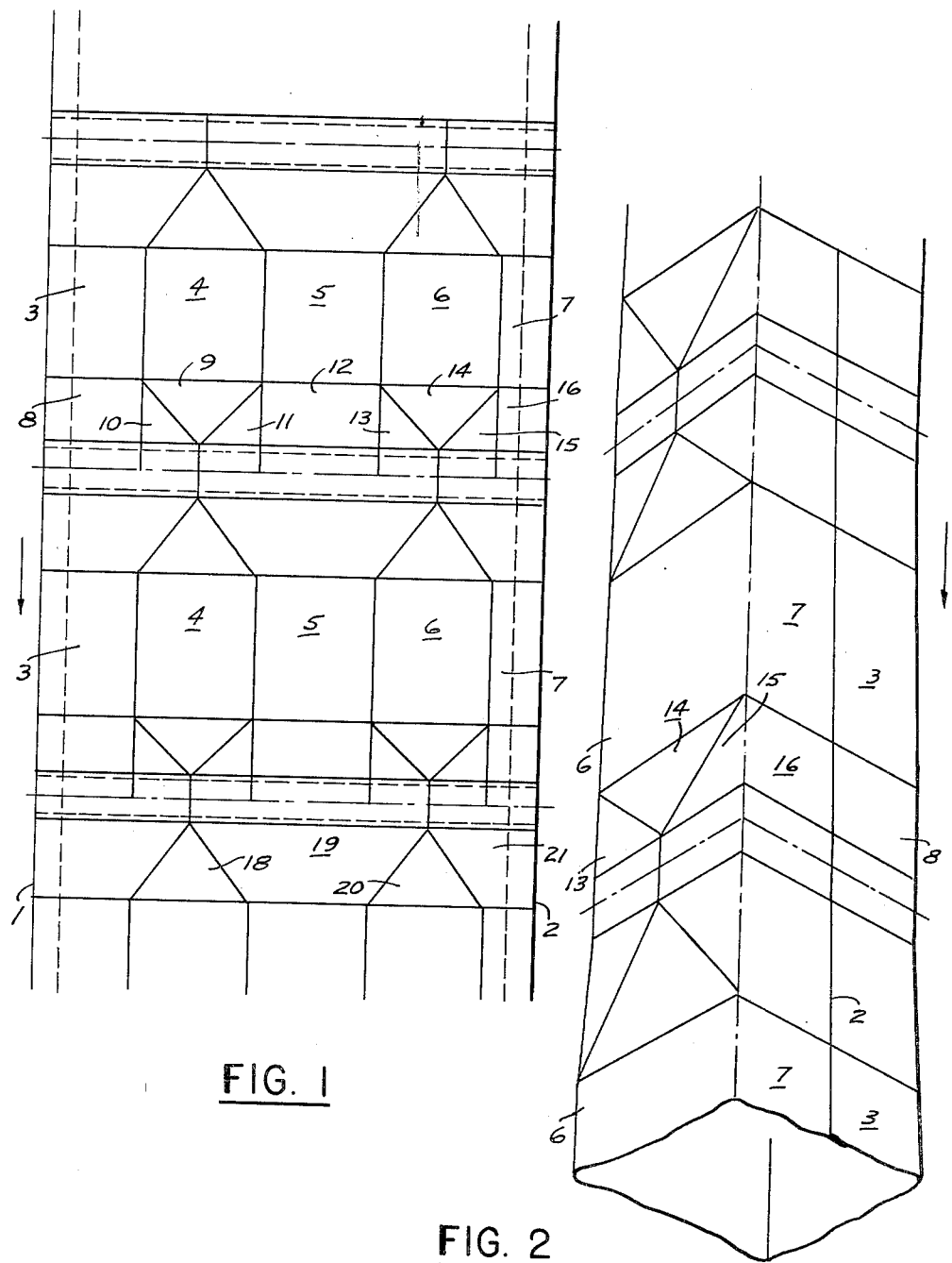

INVENTOR.
ERNST BERTIL OLÉR

INVENTOR.
ERNST BERTIL OLÉR

Aug. 14, 1962     E. B. OLÉR     3,048,951
PROCEDURE FOR CONTINUOUS MANUFACTURE AND FILLING OF CONTAINERS
Filed June 6, 1960     5 Sheets-Sheet 4

INVENTOR.
ERNST BERTIL OLÉR
BY
ATTORNEYS

Aug. 14, 1962 E. B. OLÉR 3,048,951
PROCEDURE FOR CONTINUOUS MANUFACTURE AND FILLING OF CONTAINERS
Filed June 6, 1960 5 Sheets-Sheet 5

INVENTOR.
ERNST BERTIL OLÉR
BY
ATTORNEYS

United States Patent Office 3,048,951
Patented Aug. 14, 1962

3,048,951
PROCEDURE FOR CONTINUOUS MANUFACTURE AND FILLING OF CONTAINERS
Ernst Bertil Olér, Bofors, Sweden, assignor to Aktiebolaget Bofors, Bofors, Sweden, a Swedish corporation
Filed June 6, 1960, Ser. No. 34,068
Claims priority, application Sweden June 12, 1959
2 Claims. (Cl. 53—28)

The present invention relates to a procedure for the manufacture and filling of containers by forming a tube of the container material, filling in the product which is to be packed in the tube formed and discontinuous compression of the filled tube in a transverse direction at such intervals that the parts of the tube after having been cut off along the compressed sections will form appropriate containers.

A procedure of this type has the advantage that the continuous manufacturing procedure provides for a high packing speed. Especially if the packed product is a foaming liquid it is an advantage that the containers are closed at a place which is below the liquid level in the tube.

However, the containers of this type manufactured according to known procedures have certain great disadvantages, which have had a retarding effect on the use of the advantageous method.

Some containers have had the form of a more or less flattened tube which has too poor shape-retaining properties to be suitable for packing liquids which are not intended to be emptied entirely out of the container immediately after its having been opened.

Other containers have had the form of approximately regular tetrahedrons because of the tube having been compressed alternatingly in one and the other of two planes at right angles to each other. These containers have better shape-retaining properties but can only be opened with a simple hole if they are not to be emptied completely at once. It is, consequently, difficult to pour from them. Nor do such containers have any vertical surfaces upon which advertisements can best be printed and they are generally difficult to store in refrigerators.

The purpose of the present invention is to achieve a method of the said kind which permits the manufacture of containers of the traditional prismatic type which it has hitherto not been possible to manufacture in this way.

This is achieved according to the invention in that the container material before the forming of the tube is provided with fold indications in the longitudinal direction so that the tube obtains a polygonal cross-section and in the transverse direction with such spacings that between its compressed sections the tube will obtain parts with square or rectangular cross-sections and with fold indications between the sections intended to obtain rectangular cross sections and with sections intended to be compressed, which last-mentioned fold indications originate from the longitudinal fold indications and converge in pairs towards the places where the tube has been pressed flat, whereby the prismatic containers formed will obtain closures, which in themselves are known, at their ends.

Figure 3:
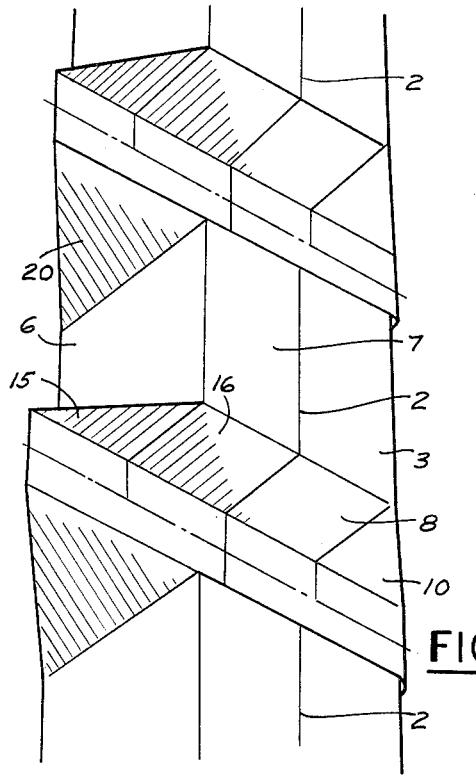
Figure 5:
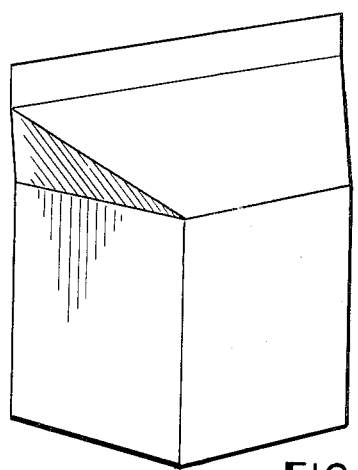
Figure 4:
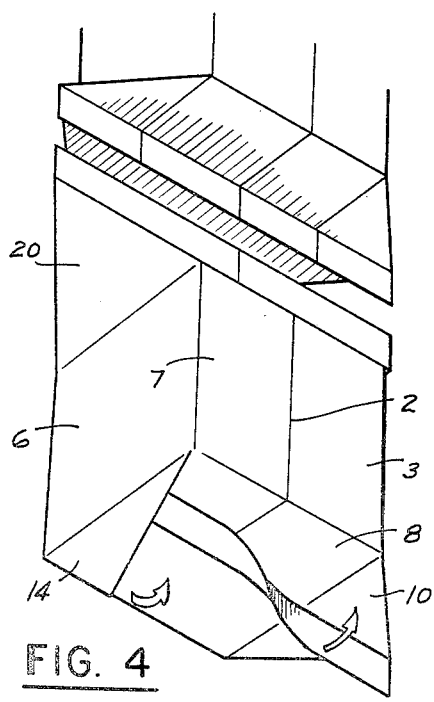
Figure 6:
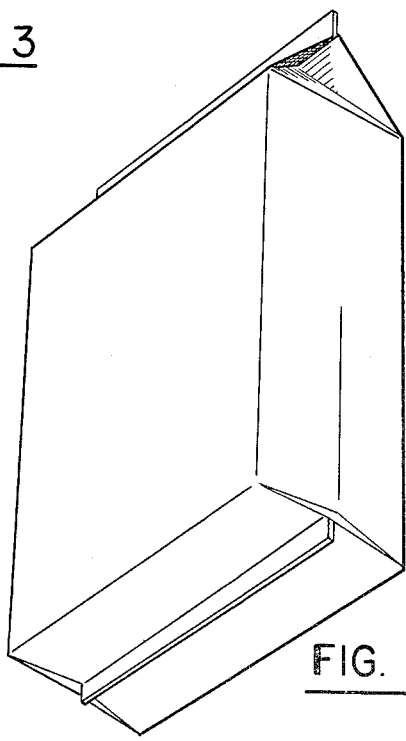
Figure 7:
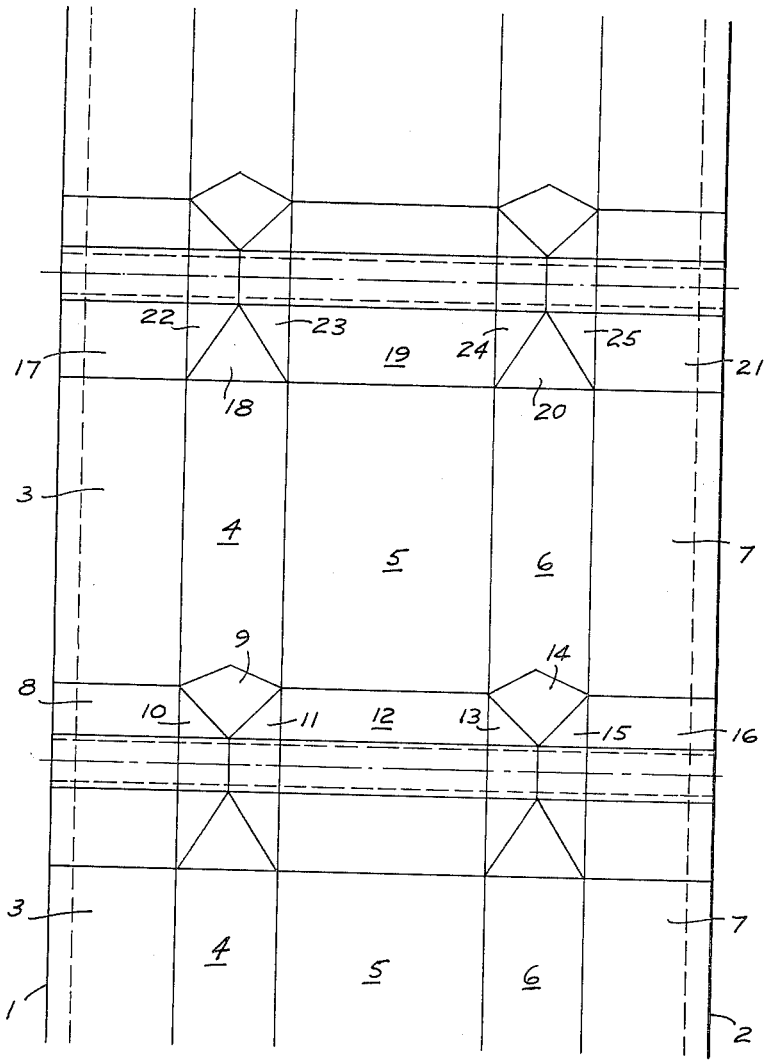
Figure 8:
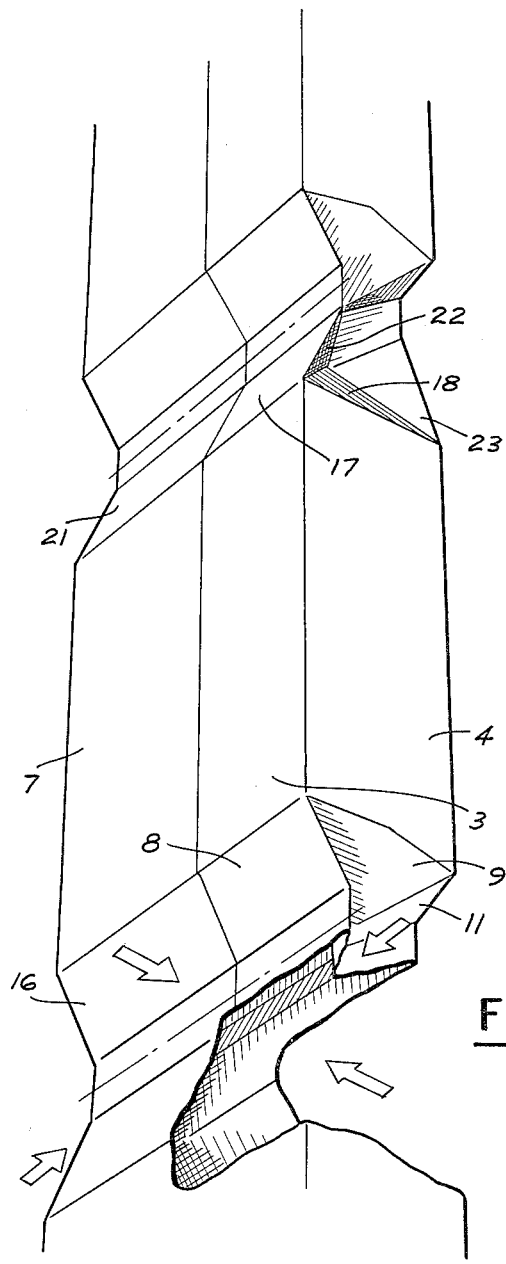
Figure 9:
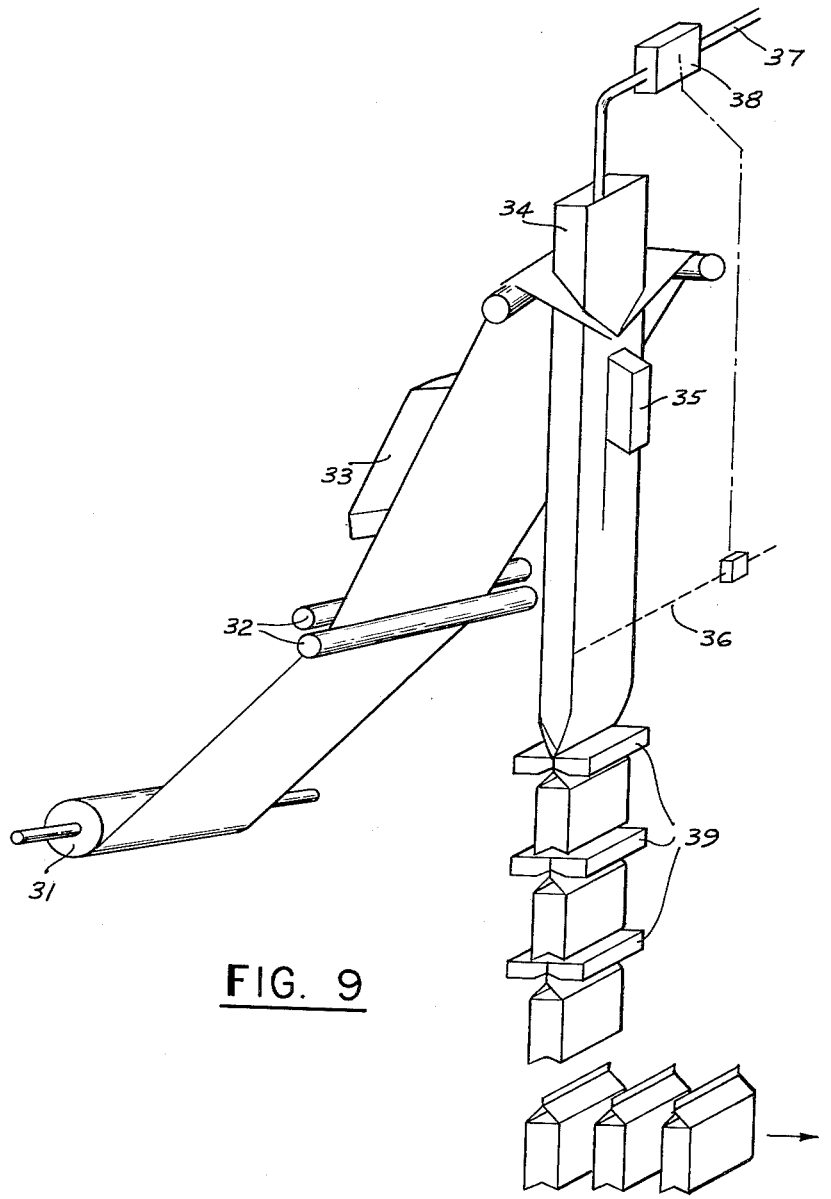

In the following the invention will be described more in detail with reference to the attached drawing in which FIGURE 1 shows a paper track provided with fold indications according to the new procedure, in which FIGURE 2 shows in perspective at an oblique angle from underneath a tube made from the paper track shown in FIGURE 1 according to the new procedure, in which FIGURE 3 shows in perspective obliquely from underneath the paper tube according to FIGURE 2 after it has been filled with the product which is to be packed and thereafter compressed so that separate containers are formed, in which FIGURE 4 shows in perspective obliquely from underneath how the containers are separated from each other and folded, in which FIGURE 5 shows in perspective obliquely from above a finished container manufactured by means of the procedure illustrated in FIGURES 1–4, in which FIGURE 6 shows another design of a container manufactured according to the invention, in which FIGURE 7 shows a paper track provided with fold indications appropriate for the manufacture of containers of the type shown in FIGURE 6, in which FIGURE 8 shows how the packing according to FIGURE 6 is closed and in which FIGURE 9 shows schematically a device for the manufacture and filling of containers.

In FIGURE 1, 1 and 2 designate the edges of a paper track. The paper is fed in the direction indicated with an arrow in the figure. During its feeding the paper track is provided with fold indications as shown by thin solid lines. The longitudinal broken lines indicate the limit for the overlapping parts of the paper when the part is formed into a square tube as shown in FIGURE 2. The transverse broken lines indicate the limits of the paper sections which during the subsequent forming of the container will be influenced by press jaws in order to achieve a closure of the containers. The transverse dot-dash lines indicate the places where the closed containers will be cut off from the paper track.

The indication lines delimit rectangular sections of the paper which in the finished container will form vertical sides and which are designated 3–7. The bottom of the container is formed by the sections designated 8–16 where the triangles 9–11 and 13–15 are isosceles and right-angled.

The tube shown in FIGURE 2 is filled with the product which it is desired to pack. The product can be in a liquid, semi-liquid or pulverized form. The tube is compressed with the aid of press jaws and the plastic-coated insides of the paper tube will become sealed together.

The tube then obtains the appearance shown in FIGURE 3.

The tops of the containers will be formed by the sections 17–21 limited by the fold lines.

After the tube has been compressed transversally, the packings can be cut off from the tube along the dot-dash lines shown in FIGURE 3. Thereafter the fin which has been formed at the compression at the bottom of the container is folded as well as the triangular sections 14 and 10 and are glued to the bottom of the container. This is shown in FIGURE 4.

The finished container will thereby obtain the appearance shown in FIGURE 5.

The design shown in FIGURE 6 is made from a paper track which has been provided with fold indications according to FIGURE 7 where paper sections corresponding to the section shown in FIGURE 1 have been given the corresponding reference designations. The design according to FIGURE 7 corresponds to the design shown in FIGURE 1 except that the longitudinal fold lines have been made continuously so that no triangular sections 22–25 are formed. Furthermore, the fold lines between sections 4 and 9 and between sections 6 and 14 have been deflected so that the area of the sections 9 and 14 have been increased somewhat. This gives the advantage that the parts of the container material which form the end of the container can be bent inwards towards the central part of the container to such a degree that no container parts will lie outside the plane which limits the prismatic portion of the container. The container is made in the same way as the container shown in FIGURE 5 except that the triangular sections 9, 14, 18 and 20 have been folded in before the container is closed with the aid of the transversally working press jaws. This is shown in FIGURE 8.

The principle of a machine for the manufacture and liquid filling of containers by means of the procedure according to the invention is shown in FIGURE 9, in which 31 designates the basic material in the form of a roll of laminated paper. The paper first runs between a pair of rolls 32, where it is given the fold indications. Thereafter the paper is surface-sterilized at the place designated 33 and formed into a tube with the aid of a tube 34 which is open in both ends and which has a rectangular cross-section, and a longitudinal joint-sealing device 35. The tube is kept filled to a certain level 36 with the liquid which is to be packed and which is fed through a tube 37. A level-control device has been designated 38. By means of the transversal press jaws 39 the tube is compressed so that the top closure is formed on the container below the press jaws at the same time as the bottom closure is formed on the container over the press jaws. The press jaws 39 are moved downwards continuously until they have reached a turning position, but before then a cutting movement takes place which cuts off the container from the following one. From the turning position the press jaws then return to an upper turning position to start a new working cycle.

The finished containers are transported away as shown by an arrow for packing in transport cases.

I claim:

1. A method of continuously forming closed containers filled with a flowable material, said method comprising the steps of providing a blank in the form of a web of sheet material including arrays of lengthwise extending parallel fold lines, longitudinally spaced transverse fold lines and slanted fold lines extending between said lengthwise fold lines and intersecting said transverse fold lines, the fold lines of each array defining side and end walls of one of the containers to be formed, said slanted fold lines being arranged between two alternate side walls of each container to be formed and further between the lower end of the side walls of each container to be formed and the upper end of the side walls of the succeeding container to be formed, each said arrangement of slanted fold lines including an upwardly peaked pair extending above the transverse fold lines forming said lower end of the side walls of each container, folding the web along the longitudinal fold lines to form a continuous tube of polygonal cross-section, joining abutting side edges of said web, moving said tube downwardly along a substantially perpendicular path, filling said tube while moving from above with said flowable material and maintaining the material at a predetermined level within the tube, applying lateral pressure to opposite slanted line sides of said tube above said flowable material therein and spaced from a succeeding unfilled tube to fold said two sides inwardly along said slanted fold lines to the central portion thereof to form a deflected end wall of said succeeding tube and a base flap and simultaneously folding said base flap along a transverse fold line by applying pressure thereto to close the top end of said filled tube and to close said base flap at said deflected end wall, and severing said adjacent tubes at the closed base flap to divide the tube into individual closed and filled containers, and continuing to fold said two sides inwardly until said sides fold upwardly into the body portion of the container along said peaked pairs of slanted lines so as to present a peaked indentation in the bottom of each said container including said base flap, the severed end of the base flap lying inside the plane which lines the end of the base of the container to have said container rest on the peripheral ends of the container.

2. A method according to claim 1 wherein said lengthwise fold lines are disposed to define a tube of substantially rectangular cross-section when folded and said slanted fold lines are disposed to define end walls situated within the peripheral outline of the tube after being subjected to said lateral pressure.

References Cited in the file of this patent

UNITED STATES PATENTS

| | | |
|---|---|---|
| 2,154,521 | Maxfield | Apr. 18, 1939 |
| 2,307,890 | Lakso | Jan. 12, 1943 |
| 2,575,544 | Zinn | Nov. 20, 1951 |
| 2,691,257 | Vogt | Oct. 12, 1954 |
| 2,917,879 | Aubin | Dec. 22, 1959 |